L. W. BUGBEE.
OPHTHALMIC MOUNTING.
APPLICATION FILED JAN. 29, 1917.
1,266,207.
Patented May 14, 1918.
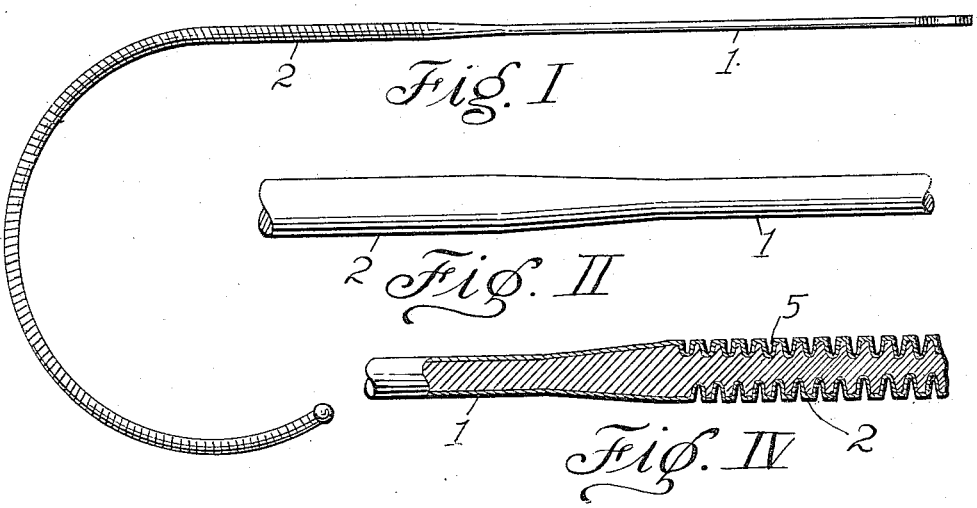
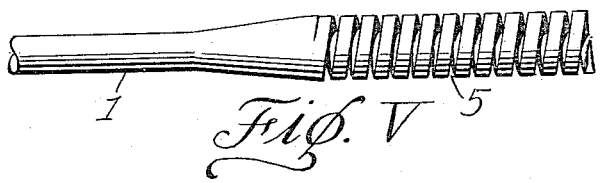
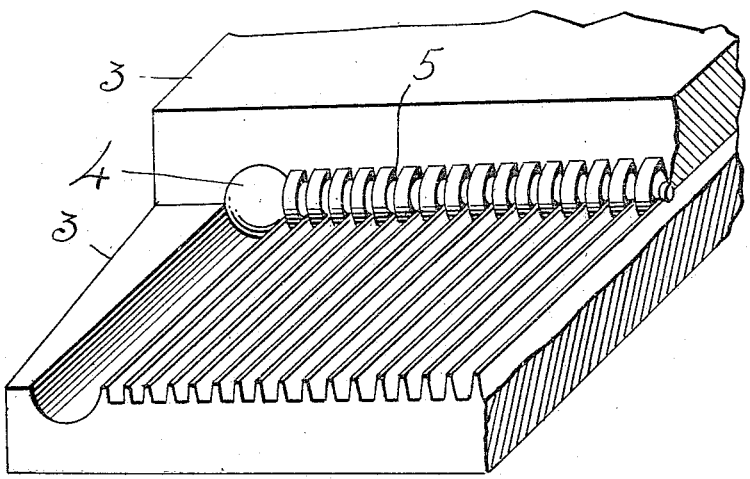
INVENTOR
LUCIAN W. BUGBEE
BY
H. H. Styll   A. H. Parsons
ATTORNEYS

UNITED STATES PATENT OFFICE.

LUCIAN W. BUGBEE, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

1,266,207.   Specification of Letters Patent.   Patented May 14, 1918.

Application filed January 29, 1917. Serial No. 145,169.

*To all whom it may concern:*

Be it known that I, LUCIAN W. BUGBEE, a citizen of the United States, residing at Southbridge, in the county of Worcester and State of Massachusetts, have invented certain new and useful Improvements in Ophthalmic Mountings, of which the following is a specification.

My invention relates to improvements in ophthalmic mountings and has particular reference to an improved construction of temple for use in connection therewith.

One of the leading objects of my present invention is the provision of a novel and improved temple and manner of constructing the same whereby the temple may be formed from a single piece of either precious or filled metal in an extremely simple and inexpensive manner.

A further object of the present invention is the provision of a one piece temple of what is commonly known as the cable type or type having an enlarged flexible ear engaging portion, which may be satisfactorily constructed from a single piece of material.

A further object of the present invention is the provision of a temple of this character which may be constructed without the use of solder or the like, and which will in the case of filled material have no exposed base metal portions or solder to become discolored in use.

Other objects and advantages of my improved construction should be readily apparent by reference to the following specification taken in connection with the accompanying drawings, and it will be understood that I may make any modifications in the specific details of construction shown and described within the scope of the appended claims without departing from or exceeding the spirit of my invention.

Figure I represents a side elevation of a temple constructed in accordance with my invention.

Fig. II represents a view of the initial step in the formation of the temple.

Fig. III represents a view of another step in the formation thereof.

Fig. IV represents a longitudinal sectional view illustrating a portion of the temple at the completion of the operation illustrated in Fig. III.

Fig. V represents a view in elevation of the construction shown in Fig. IV.

In the drawings, the numeral 1 designates the side of my improved temple which may, as shown in Fig. II, be of circular or other wire in cross section, while the numeral 2 designates the enlarged flexible ear hook portion.

This ear hook portion may, as is illustrated in Fig. II, if desired, be formed from a strip of round material, as is the side 1. In fact these parts are preferably formed from a single piece of round wire, the side 1 being first reduced and the portion which is adapted to form the ear hook left in its original size or but slightly reduced and then placed between the screw threading rolls or dies 3, as illustrated in Fig. III, said dies being so constructed as to form at the extreme end of the cable the tip or ball 4 and to roll into the intermediate portion thereof the spiral groove or thread 5, the thread being deep in the center and shallower toward both the ball end and the point of joinder with the temple side.

The parts having been thus formed with the straight side and spirally grooved ear hook, as illustrated in Fig. V, they are next placed in a swaging machine and bent to its final shape whereby the grooves will be filled by bringing the material upon opposite sides of the grooves together, as shown in Fig. I, when it will be found that I have provided an improved temple having extreme flexibility, which flexibility may be controlled as desired, both by regulating the depth of the threading or by varying the depth as just described to render the most flexible part that extending around the ear, while the portions immediately joining the side and the tip are less flexible and offer greater resistance to bending at these points. It will also be seen that by my improved construction the entire temple at its intermediate depth, in the case of filled material, is covered with a gold shell so that there is no exposed base metal, and at the same time is provided with an integral core, eliminating the necessity of the use of solder in securing the spirally wound portion to the core, and at the same time saving the trouble and expense of this winding and securing of the spiral portion or cable onto the core, while on account of the fact that the parts are integral and are formed by rolling or grooving rather than by twisting there is absolutely no liability of loosening of the parts.

I claim:

1. A one piece cable temple, comprising a temple side and an ear hook integral therewith, said ear hook being formed by first grooving the material and subsequently swaging it to fill back the groove.

2. A cable ear hook for an ophthalmic mounting, formed from a single piece of material comprising a core and an integral spiral thread surrounding the core, the said thread being flattened to present a smooth and continuous surface.

3. As a flexible ear engaging member for an ophthalmic mounting, a heavy piece of material having the outer portion thereof spirally grooved to facilitate flexing thereof and having the spirally grooved portion flattened as by swaging so that adjacent coils make a flush joint one with the other and provide a smooth ear engaging surface, substantially as illustrated.

4. A spectacle temple, comprising a single piece of material having a reduced side and a larger ear hook, the material of the ear hook being grooved or slotted to increase its pliability and being subsequently rolled or swaged to blend the edges of the grooves or slots to present a smooth ear engaging face.

5. As a temple for an ophthalmic mounting, a piece of filled stock having the ear engaging portion thereof formed with pressed grooves extending into the stock without breaking the shell, and having the material subsequently reduced to form a smooth ear engaging surface.

6. A temple for an ophthalmic mounting, comprising a side and an ear hook portion, the ear hook portion having a plurality of circumferential grooves formed therein to increase its flexibility, the depth of the grooves adjacent the point of merger of the side and ear hook sections being less than the depths of the grooves intermediate the ear hooks, whereby maximum flexibility occurs at the intermediate portions and greater rigidity is presented at the point of merger of the two surfaces, substantially as illustrated.

In testimony whereof I affix my signature in the presence of two witnesses.

LUCIAN W. BUGBEE.

Witnesses:
H. K. PARSONS,
E. M. HALVORSEN.

Copies of this patent may be obtained for five cents each, by addressing the "Commissioner of Patents, Washington, D. C."